United States Patent
Karr et al.

(10) Patent No.: US 7,478,221 B1
(45) Date of Patent: Jan. 13, 2009

(54) SYSTEM AND METHOD FOR USING CONSISTENT VIRTUAL ADDRESSES TO COMMUNICATE IN COOPERATIVE MULTI-LAYER VIRTUALIZATION ENVIRONMENTS

(75) Inventors: Ronald S. Karr, Palo Alto, CA (US); Ramana Jonnala, Sunnyvale, CA (US); Dhanesh V. Joshi, Santa Clara, CA (US); Narasimha R. Valiveti, San Jose, CA (US)

(73) Assignee: Symantec Operating Corporation, Cupertino, CA (US)

( * ) Notice: Subject to any disclaimer, the term of this patent is extended or adjusted under 35 U.S.C. 154(b) by 400 days.

(21) Appl. No.: 11/121,229

(22) Filed: May 3, 2005

(51) Int. Cl.
  *G06F 12/08* (2006.01)
(52) U.S. Cl. ...................................... 711/203
(58) Field of Classification Search ................. 711/203, 711/112
  See application file for complete search history.

(56) References Cited

U.S. PATENT DOCUMENTS

| | | | |
|---|---|---|---|
| 6,282,610 B1 | 8/2001 | Bergsten | |
| 6,912,537 B2 | 6/2005 | Selkirk et al. | |
| 6,925,528 B2 | 8/2005 | Selkirk et al. | |
| 6,978,356 B2 | 12/2005 | Selkirk et al. | |
| 6,985,490 B2 | 1/2006 | Czeiger et al. | |
| 7,043,622 B2 * | 5/2006 | Henry et al. | 711/203 |
| 7,236,987 B1 * | 6/2007 | Faulkner et al. | 707/104.1 |
| 2004/0098538 A1 * | 5/2004 | Horn et al. | 711/113 |
| 2005/0050273 A1 * | 3/2005 | Horn et al. | 711/114 |
| 2005/0223174 A1 * | 10/2005 | Mogi et al. | 711/129 |
| 2006/0010341 A1 * | 1/2006 | Kodama | 714/6 |
| 2006/0095706 A1 * | 5/2006 | Aoyama | 711/171 |
| 2006/0206603 A1 * | 9/2006 | Rajan et al. | 709/223 |
| 2006/0253549 A1 * | 11/2006 | Arakawa et al. | 709/217 |

* cited by examiner

*Primary Examiner*—Pierre-Michel Bataille
*Assistant Examiner*—Hal Schnee
(74) *Attorney, Agent, or Firm*—Meyertons Hood Kivlin Kowert & Goetzel, P.C.; B. Noël Kivlin; Anthony M. Petro

(57) ABSTRACT

A system using consistent virtual addresses to communicate in cooperative multi-layer virtualization environments includes a volume server, one or more physical storage devices, a front-end layer and a back-end layer of virtualization participants. The volume server may be configured to aggregate storage in the one or more physical storage devices into a logical volume, and to provide configuration information on the logical volume to a front-end virtualization participant and to a back-end virtualization participant. The front-end virtualization participant may be configured to send a storage request including a target virtual address identifying a block of the logical volume to the back-end virtualization participant. The back-end virtualization participant may be configured to use the configuration information to identify a physical data block at a physical storage device corresponding to the target virtual address, and to perform a physical I/O operation on the physical data block.

21 Claims, 10 Drawing Sheets

SYSTEM AND METHOD FOR USING CONSISTENT VIRTUAL ADDRESSES TO COMMUNICATE IN COOPERATIVE MULTI-LAYER VIRTUALIZATION ENVIRONMENTS

BACKGROUND OF THE INVENTION

1. Field of the Invention

This invention relates to computer systems and, more particularly, to the storage systems employing block virtualization.

2. Description of the Related Art

Many business organizations and governmental entities rely upon applications that access large amounts of data, often exceeding a terabyte or more of data, for mission-critical applications. Often such data is stored on many different storage devices, which may be centrally located or distributed throughout an enterprise. Such storage devices may be heterogeneous in nature, including many different types of devices from many different manufacturers.

Configuring individual applications that consume data, or application server systems that host such applications, to recognize and directly interact with each different storage device that may possibly be encountered in a heterogeneous storage environment would be increasingly difficult as the environment scaled in size and complexity. Therefore, in some storage environments, specialized storage management software and hardware may be used to provide a more uniform storage model to storage consumers. Such software and hardware may also be configured to present physical storage devices as virtual storage devices (e.g., logical volumes) to storage consumers, and to add storage features not present in individual storage devices to the storage model. For example, features to increase fault tolerance, such as data mirroring, snapshot/fixed image creation, or data parity, as well as features to increase data access performance, such as disk striping, may be implemented in the storage model via hardware or software. The added storage features may be referred to as storage virtualization features.

In some storage environments, multiple devices or servers may cooperate in providing storage virtualization features associated with a certain set of physical storage devices, and in providing access to a virtual storage device aggregated from the physical storage devices. Such cooperating devices or servers may be termed "virtualization participants". Depending on the types of operations being performed, virtualization participants may be grouped into different layers. For example, in a block virtualization environment, a front-end layer of virtualization participants, which may be termed "volume clients", may provide an interface for interactions with storage consumers or applications wishing to utilize the virtualization features associated with logical volumes. A back-end layer of virtualization participants, which may be termed "storage servers", may provide access to the backing physical storage devices corresponding to the logical volume. In some environments, logical volumes with a complex internal structure may be supported, where a given virtualization participant may typically have access to (or information about) only a portion of a particular logical volume.

In these types of storage environments, a virtualization participant at a given layer may need to communicate with one or more virtualization participants at the same layer or at a different layer, in order to provide a response to a storage request (e.g., a read request or a write request) from a storage consumer, or to perform an internally generated virtualization function such as recovery from a failure. Such communications may require an identification of a targeted block of the logical volume, where for example an I/O operation may need to be performed. As the number of virtualization participants that may cooperate in performing storage operations increases, and as the complexity of supported virtualization functions increases, a simple and uniform addressing scheme to identify targeted blocks in such communications between different virtualization participants may become increasingly desirable.

SUMMARY OF THE INVENTION

Various embodiments of a system and method for using consistent virtual addresses to communicate in cooperative multi-layer virtualization environments are disclosed. According to a first embodiment, a system may include a volume server, one or more physical storage devices including a first physical storage device, a front-end layer and a back-end layer of virtualization participants. The front-end layer of virtualization participants may include, for example, one or more volume clients, while the back-end layer of virtualization participants may include one or more storage servers providing access to the physical storage devices. Front-end virtualization participants (i.e., virtualization participants in the front-end layer) may interact directly with storage consumers such as applications and file systems, e.g., to receive data access or update requests from storage consumers, to generate internal storage operations on behalf of the storage consumer requests, and to send responses to storage consumer requests when the internal storage operations complete. In contrast, back-end virtualization participants (i.e., virtualization participants in the back-end layer) may not be in direct contact with storage consumers.

The volume server may be configured to aggregate storage in the one or more physical storage devices into a logical volume, and to provide configuration information on the logical volume to a front-end virtualization participant and to a first back-end virtualization participant. The front-end virtualization participant may be configured to send a first storage request including a target virtual address identifying a block of the logical volume to the first back-end virtualization participant, e.g., in response to a storage consumer request. The back-end virtualization participant may be configured to use the configuration information provided by the volume server to identify a first physical data block on the first physical storage device corresponding to the target virtual address, and to perform a first physical I/O operation on the first physical data block. The mapping of logical volume blocks to physical storage blocks may be more complex than a simple map of the logical volume to a single physical storage device; e.g., a logical volume may be mapped to portions of two or more physical storage devices.

In a second embodiment, where for example the logical volume is mirrored across multiple devices, or where a distributed virtual RAID volume is implemented, I/O at more than one physical storage device may be needed to satisfy a single storage consumer request. In such an embodiment, for example, the logical volume may be aggregated from storage at the first physical storage device and a second physical storage device, and a first back-end virtualization participant may be configured to provide access to the first physical storage device, while a second back-end virtualization participant may be configured to provide access to the second physical storage device. The volume server may be configured to provide logical volume configuration information to both the first and second back-end virtualization participants, as well as to the front-end virtualization participant. The second virtualization participant may be configured to receive a second storage request, including the identical target virtual address, and to use the configuration information to identify a second physical data block at the second physical storage device corresponding to the target virtual address. Having identified the second physical data block, the second virtualization participant may perform a desired second physical I/O on the second physical data block. The second storage request may be sent to the second back-end virtualization participant by the front-end virtualization participant, or from the first back-end virtualization participant.

In one specific embodiment, the volume server may include a generation identifier within the logical volume configuration information distributed to the front-end and back-end virtualization participants, so that different versions of the configuration information may be distinguishable from one another as the logical volume configuration changes over time. The front-end and back-end virtualization participants may be configured to include a generation identifier in each storage request, and to validate that the generation identifier in a received storage request matches the latest version of the configuration information available at the receiving virtualization participant prior to performing the requested operation. If a generation identifier in a storage request received at a target back-end virtualization participant does not match the generation identifier of the latest configuration information previously received at the target back-end virtualization participant, for example, the target back-end virtualization participant may not perform the requested physical I/O operation, and may return an error message to the requester. The requesting front-end virtualization participant may then proceed to get a new version of configuration information and may retry the storage request with the generation identifier included in the new version. In some embodiments, some storage devices and protocols used to access a logical volume may allow use of a generation identifier as a data protection mechanism, while other devices may use other data protection techniques such as I/O fencing (e.g., using SCSI-3 group reservations), or may employ no data protection mechanism.

Figure 1:
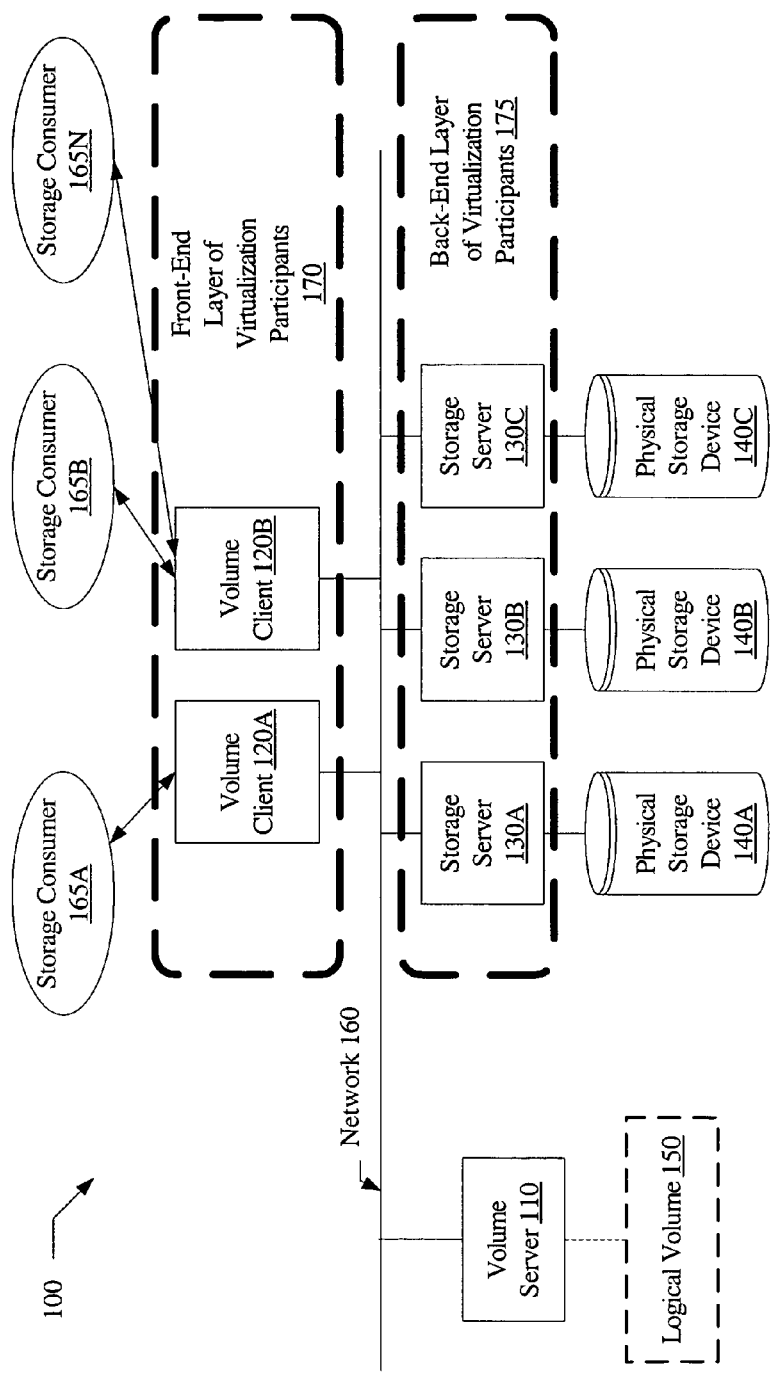
FIG. 1 is a block diagram illustrating one embodiment of a storage system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating one embodiment of a storage system 100. In the illustrated embodiment, system 100 includes a volume server 110, physical storage devices 140A-140C (which may be collectively termed physical storage devices 140 herein), a front-end layer of virtualization participants 170 and a back-end layer of virtualization participants 175. The term "virtualization participant", as used herein, refers to a device, a host, or a software module that is configured to participate in a process of responding to a storage consumer's request to access and/or modify a block of a virtual storage device. As described below in further detail, the process of responding to a given request may require cooperation between two or more virtualization participants, and such cooperating virtualization participants may serve as intermediaries between the storage consumer and the one or more physical storage blocks at which physical I/O may need to be performed in response to a given consumer request.

The front-end layer of virtualization participants 170 may include volume clients 120A and 120B (collectively, volume clients 120), while the back-end layer 175 may include storage servers 130A-130C (collectively, storage servers 130). Thus, in the depicted embodiment, both volume clients 120 and storage servers 130 may be examples of virtualization participants. A front-end virtualization participant (i.e., a virtualization participant within the front-end layer 170), such as a volume client 120, may be configured to interact directly with one or more storage consumers 165; that is, to receive storage requests generated by storage consumers 165 and to provide responses to the storage consumers after the I/O operations associated with the storage requests are completed. A back-end virtualization participant (i.e., a virtualization participant within back-end layer 175), such as a storage server 130, may be configured to provide the front-end virtualization participants, other back-end virtualization participants, and volume server 110, with access to one or more physical storage devices 140. Back-end virtualization participants may not interact directly with storage consumers 165. The virtualization participants of both front-end layer 170 and back-end layer 175, as well as volume server 110, may be coupled to a network 160. As described in further detail below, in some embodiments more than two layers of virtualization participants may be employed.

Volume server 110 may be configured to aggregate storage in one or more physical storage devices 140 into a logical volume 150, and provide configuration information on the logical volume 150 to one or more volume clients 120 and one or more storage servers 130. The configuration information may include a mapping of the logical volume to physical storage within two or more physical storage devices 140 in some embodiments. In response to a storage request from a storage consumer 165, a volume client 120 may use the configuration information to select an appropriate storage server 130, and send an internal request corresponding to the consumer's storage request, including a virtual address for a target block of the logical volume 150, to the selected storage server 130. The term "internal request" or "internal storage request" may be used herein to refer to a request sent by one virtualization participant to another virtualization participant, as distinguished from a storage consumer-generated request. The storage server 130 may be configured to use the configuration information provided by volume server 110 to identify a physical block of a physical storage device corresponding to the virtual address, and to perform a desired I/O operation on the physical block.

In some embodiments, a single logical volume 150 may be formed from a plurality of devices, where some devices (e.g., storage servers 130) are configured to use virtual addresses to refer to logical volume data, while other devices (e.g., simple disk array devices) are not. In such embodiments, the subset of devices that are capable of translating the virtual addresses to physical addresses may be configured to provide the virtual-to-physical address translations to the devices that do not use virtual addresses. In addition, in some embodiments, more than one storage protocol (e.g., iSCSI and Fibre-channel SCSI, or SCSI and a cooperative extended I/O protocol) may be used to access a logical volume 150. For example, a first subset of physical storage devices mapped to the logical volume may be accessible via iSCSI, and a second subset of physical storage devices mapped to the same logical volume may be accessible via Fibre-channel SCSI. Virtualization participants such as volume clients 120 and storage servers 130 may also use virtual addresses as described above when multiple storage protocols are in use for logical volume 150.

In the embodiment depicted in FIG. 1, the physical storage devices 140 may be physical block devices. Generally speaking, a physical block device may comprise any hardware entity that provides a collection of linearly addressed data blocks that can be read or written. For example, in one embodiment a physical block device 140 may be a single disk drive configured to present all of its sectors as an indexed array of blocks. In another embodiment, a physical block device may comprise a set of individual disk drives organized as a hardware disk array. Such a hardware disk array may present data from its constituent disk drives as a single contiguous storage address range. It is contemplated that any suitable type of storage device may be configured (singly or as part of a collection or an array) as a physical block device, such as fixed or removable magnetic media drives (e.g., hard drives, floppy or Zip-based drives), writable or read-only optical media drives (e.g., CD or DVD), tape drives, solid-state mass storage devices, or any other type of storage device. Physical storage devices 140, such as disks or tape drives, may be configured to present some form of SCSI interface, though other interfaces are possible and contemplated.

As noted above, a storage server 130 may be configured to provide access to one or more physical block devices 140. In some embodiments, one or more physical block devices 140, such as disk arrays and/or individual disks, may be physically hosted at a storage server 130. In other embodiments, a storage server may be physically separated (e.g., in a different physical enclosure) from the physical block devices 140 to which it provides access. In some embodiments, storage servers 130 may participate in a security protocol to prevent unauthorized access to storage devices; e.g., each storage server 130 may be provided with a list of volume clients 120 and volume servers 110 authorized to access subsets of specific physical storage devices 140 managed at the storage server 130. As described below in further detail, a volume server 110 may provide a given storage server 130A with configuration information on volume 150, which may include, for example, security-related information as well as a layout of volume 150 on physical block devices 140, some of which may be hosted at other storage servers, such as storage server 130B.

In one embodiment, a storage server 130 may be configured to implement an advanced block I/O interface optimized to service requests from volume servers 110 and volume clients 120. That is, authorized volume servers and volume clients may communicate with storage server 130 over network 160 using an advanced storage access protocol that may differ from more traditional interfaces (such as variants of SCSI or iSCSI). The advanced storage access protocol may support features, such as access security and tagged directives for distributed I/O operations, that may not be adequately supported by the traditional interfaces alone. In such an embodiment, storage server 130 may translate data access requests from the advanced storage protocol to a lower level protocol or interface (such as SCSI) that may be presented by the physical block devices 140 managed at storage server 130. While the advanced storage access protocol may provide enhanced functionality, it may still allow block-level access to physical block devices 140. E.g., volume clients 120 and volume server 110 may still access a block of physical block device 140 without requiring the use of a file system.

Generally speaking, a logical volume 150 (which may also be referred to herein as a volume) may comprise a block device that may be presented directly for use by a block device consumer, e.g., a file system or an application (such as a database application) that can directly use block devices. As described in greater detail below, in some embodiments employing block device virtualization, a given volume 150 may be associated with several logical or physical block devices. In such embodiments, each block device included in the logical organization of a given volume or virtualized block device may be referred to as a storage object or logical storage object.

A volume may differ from a block device interface implemented in a hardware device or that is accessed through a system disk driver, in that the latter block devices may not present a system-independent block device interface that can be opened for direct use by a consumer. Instead, a system-dependent disk driver may be required to access such block devices. In embodiments employing block virtualization, such a disk driver may be generally unaware of block virtualization and may in some instances present a barrier to using some virtualization techniques, whereas a volume implementing various block virtualization features may be directly accessible by a consumer without the issues presented by such disk drivers.

A volume manager, such as volume server 110, may introduce virtualization of blocks, creating some number of virtualized block devices out of one or more physical or logical block devices. (In some embodiments, devices such as disk arrays and virtualization switches may also be configured to perform block virtualization.) In one embodiment of block virtualization, one or more layers of software and/or hardware rearrange blocks from one or more block devices, such as disks, and add various kinds of functions. The resulting rearranged collection of blocks may then be presented to a block device consumer, such as an application or a file system, as one or more aggregated devices with the appearance of one or more basic disk drives. That is, the more complex structure resulting from rearranging blocks and adding functionality may be presented as if it were one or more simple arrays of blocks, or logical block devices. It is noted that a virtualized block device may also be referred to as a logical block device, and that in some embodiments, multiple layers of virtualization may be implemented. That is, one or more block devices may be mapped into a particular virtualized block device, which may be in turn mapped into still another virtualized block device, allowing complex storage functions to be implemented with simple block devices.

In various embodiments, block virtualization can support the creation of virtualized block devices implementing numerous different types of storage functions. For example, in one embodiment a virtualized block device may implement device striping, where data blocks may be distributed among multiple physical or logical block devices, and/or device spanning, in which multiple physical or logical block devices may be joined to appear as a single large logical block device. In some embodiments, virtualized block devices may provide mirroring and other forms of redundant data storage, the ability to create a snapshot or static image of a particular block device at a point in time, and/or the ability to replicate data blocks among storage systems connected through a network such as a local area network (LAN) or a wide area network (WAN), for example. Additionally, in some embodiments virtualized block devices may implement certain performance optimizations, such as load distribution, for example, and/or various capabilities for online reorganization of virtual device structure, such as online data migration between devices, replication (which may be synchronous or asynchronous), and point-in-time snapshots. Block virtualization may provide any or all of these capabilities in a fashion transparent to virtualized block device consumers. That is, virtualized block devices may appear as generic storage devices to consumers such as file systems and applications.

Volume server 110 may provide functions such as configuration management of virtualized block devices and distributed coordination of block device virtualization. In response to a request to configure a virtual block device, for example according to a desired set of virtualization features, volume server 110 may be configured to build volume configuration information that describes how a collection of storage objects compliant with the desired features maps to underlying physical block devices 140 accessible through one or more storage servers 130. The volume configuration information for a particular volume 150 may be distributed to virtualization participants such as one or more volume clients 120 as well as the storage servers 130 providing access to the underlying physical block devices 140. In one embodiment, such volume configuration information may include a tree of storage objects such as described in greater detail below in conjunction with the description of FIG. 9. Each virtualization participant may be configured to interact with volume server 110 for certain functions, for example management or administrative functions. For typical block read and write activity, each volume client 120 may be configured to interact with the appropriate storage server 130 according to the volume configuration information distributed by volume server 110.

The structure of the volume 150, for example as indicated by a corresponding storage object tree, may indicate to a given virtualization particpant how the volume relates to one or more underlying physical storage devices. In one embodiment, the leaf nodes of such a tree may correspond to one or more physical block devices 140, and the root node of such a tree may be a logical block device through which the volume is accessed. Distribution of a virtualized block device as a volume to one or more virtualization participants may also be referred to as distributed block virtualization. In some embodiments, after volume server 110 has distributed volume configuration information for a given virtual block device to a given volume client 120 as a particular volume 150, the given volume client 120 may interact with that particular volume 150 to read and write blocks without further involvement on the part of volume server 110. That is, the given volume client 120 may use the configuration information to identify the specific storage servers 130 that may need to perform I/Os corresponding to a storage request from a storage consumer 165, and communicate directly with the specific storage servers 130.

A storage request from a storage consumer 165 such as a file system or a database management system may typically identify a targeted block of a logical volume 150 using a virtual address, such as a logical volume name and an offset within the logical volume. In some traditional implementations of block virtualization, the task of translating a virtual block address to a corresponding physical block address is performed at front-end virtualization participants such as volume clients 120, and storage servers 130 are not provided with volume configuration information required to translate virtual addresses to physical addresses. That is, in such a traditional implementation, a volume client may use the configuration information provided by the volume server 110 to identify the specific physical block address at a physical storage device 140 corresponding to the virtual block address, to prepare an I/O request containing the physical block address, and to send the I/O request to the appropriate storage server 130.

Such a traditional implementation may not be able to easily or efficiently support certain kinds of virtualization functions, however, especially functions that may require operations at more than one storage server. For example, one such function is recovery from a media read error at a particular mirror of a mirrored logical volume 150, where each mirror of the logical volume is accessible via a different storage server 130. One efficient method of recovery would include the first storage server (where the media read error occurred) reading the target data block from a second mirror at a second storage server, writing the data back to the media, validating that the write completed successfully, and delivering the data back to the requester. Such a recovery method may not be easy to implement in the traditional implementation, because the first storage server may not have the volume configuration information required to identify the second storage server, or the address of the target data block within the second mirror. Other virtualization functions involving multiple cooperating storage servers, such as efficient creation of clones or snapshots, efficient recovery from replication failures, etc., may also not be easily supported in traditional implementations, i.e., without providing sufficient volume configuration information to the storage servers.

Figure 2:
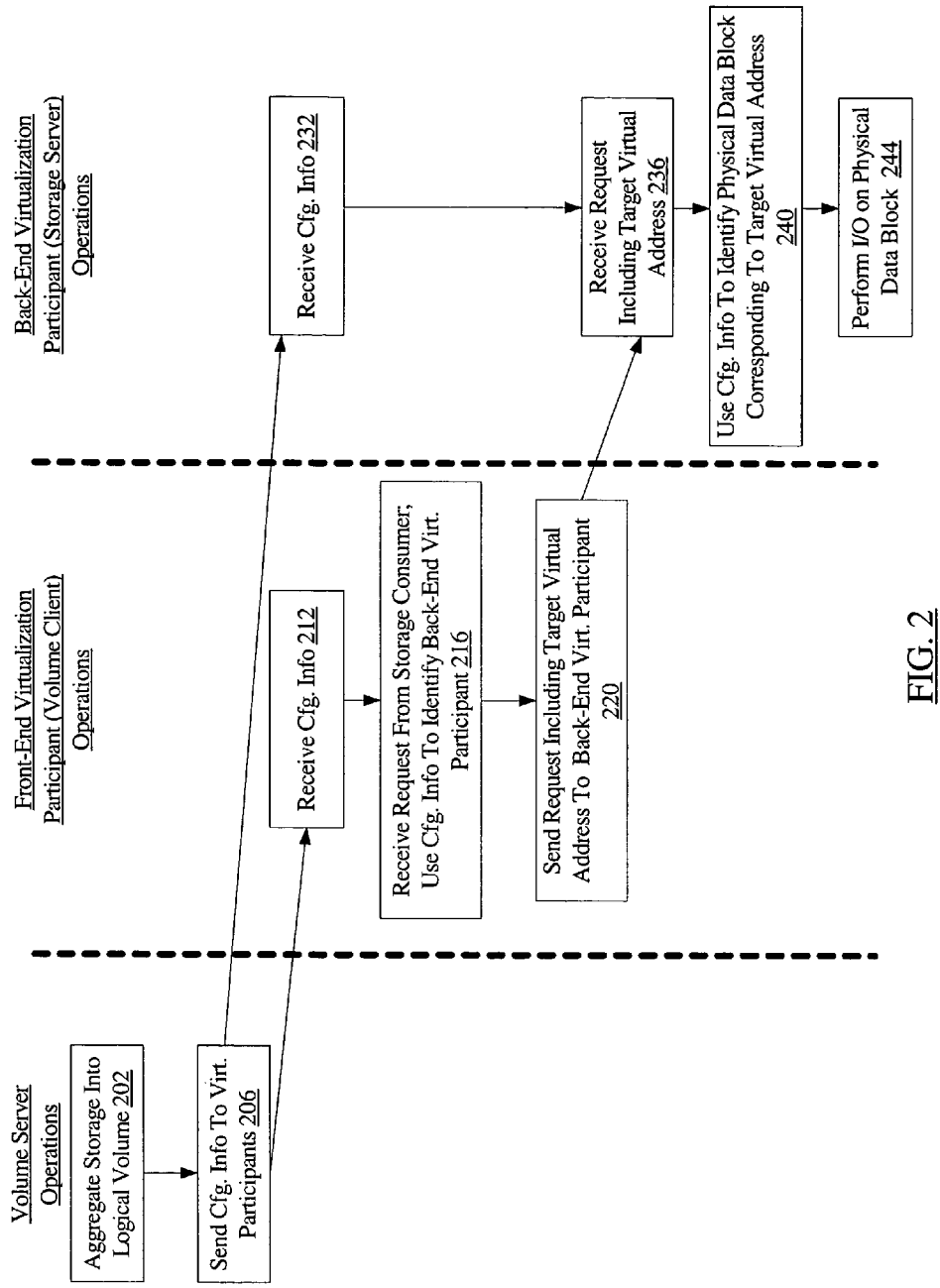
FIG. 2 is a flow diagram illustrating aspects of the operation of a volume server, a front-end virtualization participant and a back-end virtualization participant according to one embodiment.

In order to be able to more easily support such virtualization functions, as described above, in one embodiment a volume server 110 may be configured to provide configuration information for a given logical volume 150 to one or more back-end virtualization participants, in addition to one or more front-end virtualization participants. The task of translating virtual block addresses to physical block addresses may be performed at the back-end virtualization participants in such an embodiment. FIG. 2 is a flow diagram illustrating aspects of the operation of a volume server 110, a front-end virtualization participant such as a volume client 120, and a back-end virtualization participant such as a storage server 130, in such an embodiment. The volume server 110 may be configured to aggregate storage at one or more physical storage devices 140 into a logical volume 150 (block 202 of FIG. 2), and to send configuration information on the logical volume 150 to a front-end virtualization participant such as a volume client 120 and to a back-end virtualization participant such as a storage server 130 (block 204). Further details on the contents of the configuration information in different embodiments are provided below. The front-end virtualization participant and the back-end virtualization participant may each be configured to receive the volume configuration information (blocks 212 and 232 respectively).

When a storage request from a storage consumer 165, identifying a target block of the logical volume 150, is received at the front-end virtualization participant, the front-end virtualization participant may be configured to use the configuration information to identify the back-end virtualization participant whose cooperation may be required in order to perform the physical I/O required to satisfy the storage consumer's request (block 216). (As described below in greater detail, in some cases, cooperation from more than one back-end virtualization participant may be required.) The front-end virtualization participant may then be configured to send an internal request containing a target virtual address of the target block to the identified back-end virtualization participant (block 220). The virtual address of the target block may be obtained directly from the storage consumer's request in some embodiments, while in other embodiments the front-end virtualization participant may be configured to obtain the virtual address by performing one or more operations (e.g., a translation from an external, user-friendly volume name to an internal system-level volume identifier) on the contents of the storage consumer's request. In one embodiment, where, for example, security information authenticating the front-end virtualization participant as a trusted entity may have to be included in the internal request, the internal request may differ in format from the storage consumer request. In another embodiment, the front-end virtualization participant may be configured to simply pass the storage request from the storage consumer on to the back-end virtualization participant; i.e., the internal request and the storage consumer request may be identical.

The back-end virtualization participant may be configured to receive the request including the target virtual address (block 236), and to use the volume configuration information received earlier to identify a physical data block at a physical storage device 140 corresponding to the target virtual address (block 240), i.e., to translate the target virtual address to a physical address at which a physical I/O may need to be performed. The back-end virtualization participant may then perform a physical I/O operation on the physical data block (block 244 of FIG. 2), and return a response (which may, for example, include data for a read request or status for a write request) to the front-end virtualization participant. The front-end virtualization participant may pass the response on to the requesting storage consumer. In some embodiments, the front-end virtualization participant may modify the format of the response, or generate a new response in a format appropriate for the storage consumer, instead of passing on the response exactly as received from the back-end virtualization participant.

In some embodiments, a volume server 110 may be configured to distribute configuration information on all defined volumes 150 to each virtualization participant present within a system. Such embodiments may be referred to as symmetric distributed block virtualization systems. In other embodiments, configuration information on specific volumes may be distributed only to respective virtualization participants, such that at least one volume 150 is not common to two virtualization participants. Such embodiments may be referred to as asymmetric distributed block virtualization systems. In one embodiment, configuration information on all defined volumes 150 may be distributed to each virtualization participant within a given layer of virtualization participants (e.g., to each volume client 120 within a front-end layer of virtualization participants 170), but may not be distributed to each virtualization participant at another layer of virtualization participants.

Depending on the specific virtualization functions being supported, in some embodiments a storage request from a storage consumer 165 may result in physical I/Os being performed at more than one physical storage device 140. For example, a mirrored logical volume 150 may include a first mirror at a first physical storage device 140A accessed via a first storage server 130A, and a second mirror at a second physical storage device 140B accessed via a second storage server 130B. A logical write to a block of such a mirrored logical volume may result in two physical write operations, one at each of the two physical storage devices containing a mirror. In another embodiment, a logical volume 150 may implement a distributed parity-based redundancy scheme, such as a redundancy scheme corresponding to any of various RAID (Redundant Arrays of Inexpensive Disks) storage organizations. An update of a data block at a given physical storage device 140A, accessed via a first storage server 130A, may require a parity computation based on the contents of a parity block located at another physical storage device 140B at another storage server 130B, and an update to the parity block. In each of these example configurations, two or more physical I/Os may be performed, with the cooperation of two or more storage servers 130, in response to a single storage request from a storage consumer 165. Various other virtualization functions, such as updates to Dirty Region Logging (DRL) maps used for efficient mirror resynchronizations, replication or other data movement operations, etc., may also involve participation from more than one storage server 130 and/or from one or more volume client 120. In addition, responses to certain types of errors, such as media read errors described above, or a path failure between a given volume client 120 and a given physical storage device 140 (where an alternate path may be available from a different volume client 120 and/or a different storage server 130), may require communication and cooperation between multiple virtualization participants at one or more level.

In such embodiments, the distribution of volume configuration information by the volume server 110 to each cooperating virtualization participant may be particularly useful. For front-end virtualization participants, such a distribution may allow the identification of the appropriate back-end virtualization participants with which communication may be required in response to a consumer storage request, without requiring virtual-to-physical address translations to be performed at the front-end layer. For back-end virtualization participants, such a distribution may allow a translation from a target virtual block address to a physical block address to be performed locally, without requiring one back-end virtualization participant to be aware of configuration details at other back-end virtualization participants, or to be notified of any virtual-to-physical mapping changes at other back-end virtualization participants. Back-end layer configuration changes (e.g., the replacement of a directly-attached disk device 140A at a given storage server by another disk device 140B accessed through a fibre channel switch, or a redistribution of logical volume data on more or fewer physical storage devices 140) may be performed with a minimal impact on front-end virtualization participants. That is, as long as enough configuration information is provided to the front-end virtualization participants to allow the appropriate back-end virtualization participants to be contacted for any storage request, details of back-end configurations or configuration changes may not be required at the front-end layer. As described below in further detail, the contents of the configuration information provided to different virtualization participants may vary in different embodiments.

Figure 3:
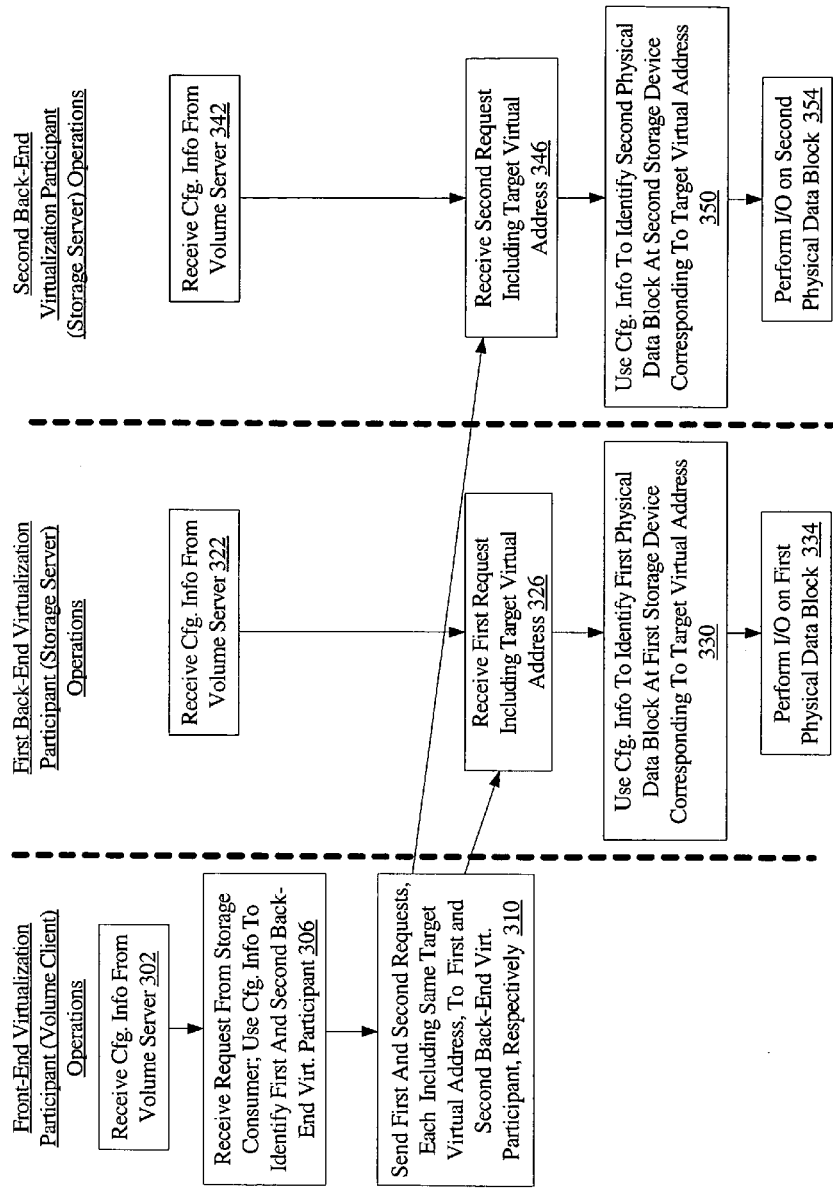
FIG. 3 is a flow diagram illustrating aspects of the operation of a front-end virtualization participant and a first and a second back-end virtualization participant during a storage operation that includes a physical I/O at each of two physical storage devices, according to one embodiment.

FIG. 3 is a flow diagram illustrating aspects of the operation of a front-end virtualization participant (such as a volume client 120) and a first and a second back-end virtualization participant (such as storage servers 130A and 130B) during a storage operation that includes a physical I/O at each of two physical storage devices 140A and 140B, according to one embodiment. The volume server 110 (whose operations are not shown in FIG. 3) may be configured to aggregate storage at the physical storage devices into a logical volume 150, as in FIG. 2, and to distribute configuration information on the logical volume to the front-end virtualization participant as well as to the first and second virtualization participants. The front-end virtualization participant, such as a volume client 120, and the back-end virtualization participants, such as storage servers 130A and 130B, may each be configured to receive the configuration information from the volume server (blocks 302, 322 and 342 of FIG. 3). Upon receiving a storage request from a storage consumer 165, identifying a target block of the logical volume 150, the front-end virtualization participant may be configured to use the configuration information to identify the first and second back-end virtualization participants as entities whose cooperation may be required to perform physical I/Os related to the storage request (block 306). The front-end virtualization participant may then send a first and a second internal storage request, each of which includes the same target virtual address identifying the target block, to the first and second back-end virtualization participants, respectively (block 310). That is, the identical virtual address may be specified in both internal storage requests.

Each of the first and second back-end virtualization participants may be configured to receive a respective internal storage request (blocks 326 and 346). The first back-end virtualization participant may use the configuration information previously received from the volume server 110 to identify a first physical data block at a first physical storage device 140A corresponding to the target virtual address (block 330), and to perform the needed physical I/O operation on the first physical data block (block 334). Similarly, the second back-end virtualization participant may be configured to identify a second physical data block (such as a mirrored block) at a second physical storage device 140B, corresponding to the target virtual address (block 350), and to perform the needed physical I/O operation on the second physical data block (block 354). In some embodiments, where for example parity computations may be required based on the contents of corresponding blocks at each of the two physical storage devices, one or more additional operations (such as an exchange of old parity information or old data information between the two back-end virtualization participants) may be required prior to the completion of the two physical I/Os. It is noted that the specific types of operations or processing steps performed (including the details of address translation) may differ from one back-end virtualization participant to another, depending on the specific virtualization function being performed; e.g., in an embodiment employing parity-based redundancy, one back-end virtualization participant may be configured to store only parity blocks, while another back-end virtualization participant may store only data blocks.

In some embodiments, a particular back-end virtualization participant may be designated as an I/O coordinator for a given logical volume 150 or for a subset of a logical volume 150. Instead of requiring the front-end virtualization participant to send separate internal requests to each back-end virtualization participant, e.g., for a write operation on a mirrored logical volume 150, in such embodiments the front-end virtualization participant may be configured to send only a single internal storage request to the I/O coordinator, and the I/O coordinator may be responsible for coordinating the one or more physical I/Os corresponding to a given storage consumer request. Such an arrangement may provide several advantages, such as improved load balancing among the links of a storage network such as network 160, reduced locking-related messaging, etc. For example, the use of an I/O coordinator may reduce the load on outgoing network connections from volume clients 120 to storage servers 130, and increase the load on outgoing network links from storage servers (which may otherwise be underutilized, especially in write-intensive environments).

Figure 4:
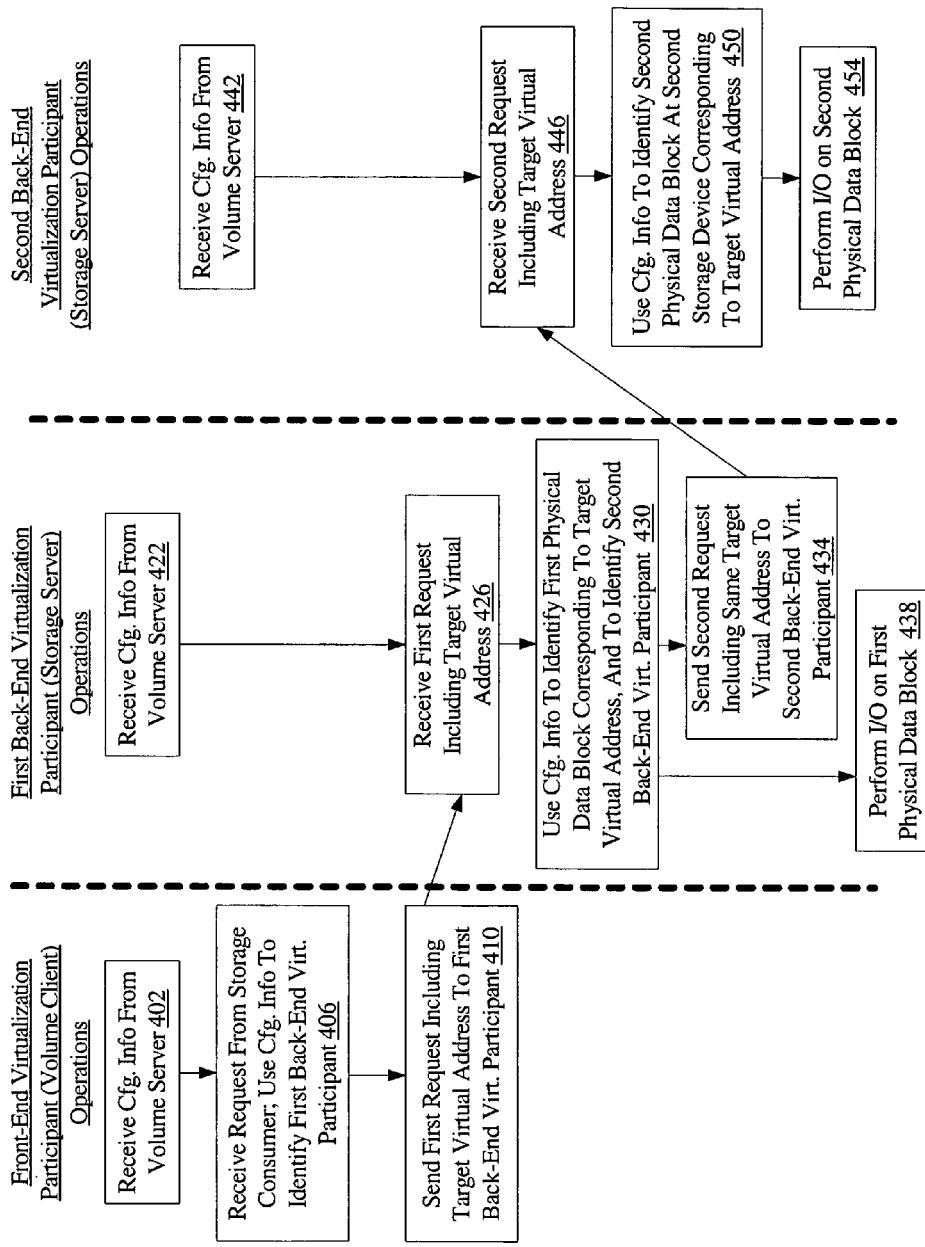
FIG. 4 is a flow diagram illustrating aspects of the operation of a front-end virtualization participant and a first and second back-end virtualization participant in an embodiment where the first back-end virtualization participant has been designated as an I/O coordinator for a logical volume.

FIG. 4 is a flow diagram illustrating aspects of the operation of the front-end virtualization participant and a first and second back-end virtualization participant in one such embodiment, where the first back-end virtualization participant has been designated as an I/O coordinator for logical volume 150. As in the embodiment illustrated in FIG. 3, volume server 110 (whose operations are not shown in FIG. 4) may be configured to distribute configuration information on volume 150 to the front-end virtualization participant as well as to the first and second back-end virtualization participants. The front-end virtualization participant, the first back-end virtualization participant or I/O coordinator, and the second back-end virtualization participant, may each be configured to receive the configuration information from the volume server 110 (blocks 402, 422 and 442 of FIG. 4, respectively). On receiving a storage request from a storage consumer 165, the front-end virtualization participant may use the configuration information to identify the first back-end virtualization participant as the I/O coordinator (block 406), and to send a first internal storage request including a target virtual address of a target block of logical volume 150 to the first back-end virtualization participant (block 410).

Upon receiving the first internal storage request from the front-end virtualization participant (block 426), the first back-end virtualization participant may be configured to use the configuration information to determine whether cooperation with any other back-end virtualization participant is needed in order to perform the physical I/Os corresponding to the request. In the depicted embodiment, for example, the first back-end virtualization participant may determine that a first physical I/O may be needed at a first physical data block at a local physical storage device 140A, and that an addition physical I/O may be needed at the second back-end virtualization participant (block 430). The first back-end virtualization participant may then be configured to generate a second internal storage request, including the same target virtual address that was included in the first internal storage request, and send the second internal storage request to the second back-end virtualization participant (block 434). In addition, the first back-end virtualization participant may be configured to perform the first physical I/O at the first physical storage device (block 438).

The second back-end virtualization participant may be configured to receive the second internal storage request (block 446), use the configuration information previously provided by the volume server to identify a second physical data block at a second physical storage device 140B corresponding to the target virtual address (block 450), and perform a second physical I/O at the second physical storage device (block 454). The first and second physical I/Os may complete in any order relative to each other. When the second physical I/O is completed (e.g., in the case of a write, when an updated data block is written to persistent storage), the second back-end virtualization participant may be configured to send a completion indication to the first back-end virtualization participant, which may in turn send a completion indication to the front-end virtualization participant when both the first and second physical I/Os are complete.

While the embodiments illustrated in FIG. 3 and FIG. 4 have depicted only two back-end virtualization participants, in general the techniques illustrated may be applied to configurations including any desired number of participating back-end and front-end virtualization participants. For example, a logical volume 150 may comprise any desired number of mirrors, each of which may be accessible via a different storage server. In an embodiment employing a four-way mirrored logical volume 150, a volume server 110 may distribute configuration information to each of four back-end virtualization participants, and each of the four back-end virtualization participants may be configured to receive respective internal storage requests containing an identical virtual address, perform address translations and physical I/Os as described above. As noted earlier, in some embodiments portions of a logical volume 150 may be accessible only via devices or protocols that may not be capable of virtual address interpretation. That is, part of a logical volume may be accessible via devices such as storage servers 130 that are operable to translate virtual addresses to physical addresses using a mapping provided by a volume server, while other parts may be accessible only through simple storage devices that may only be capable of dealing with physical addresses. In such embodiments, the devices that are capable of virtual-to-physical address translation may be configured to provide the translated physical addresses to those devices that cannot perform the translation on their own.

Figure 5:
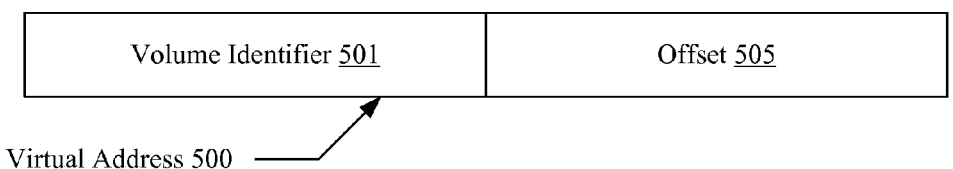
FIG. 5 is a block diagram illustrating an exemplary virtual address for a block of a logical volume, according to one embodiment.

FIG. 5 is a block diagram illustrating an exemplary virtual address 500 for a block of a logical volume 150, according to one embodiment. The virtual address 500 may include a volume identifier 501 and an offset 505 within the volume. The format used for volume identifiers 501 and offsets 505 may differ in different embodiments. For example, in some embodiments, descriptive or user-friendly names (e.g., "DatabaseVolume001") may be used as volume identifiers 501, while in other embodiments, a volume identifier may consist of a system-generated name or number (e.g., "vol001"). The offset within the volume may be expressed as a single number (e.g., an integer) in some embodiments, while in other embodiments, the offset may include multiple fields, such as a stripe column and an offset within the stripe column.

Figure 6:
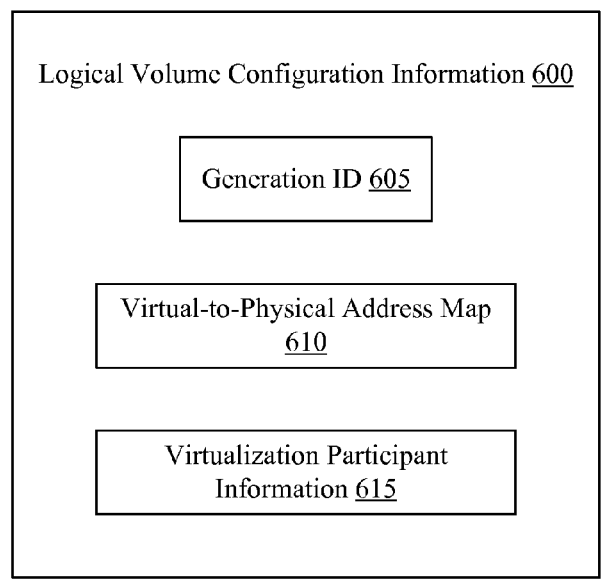
FIG. 6 is a block diagram illustrating exemplary contents of configuration information for a logical volume that may be distributed by a volume server to one or more virtualization participants, according to one embodiment.

FIG. 6 is a block diagram illustrating exemplary contents of configuration information 600 for a given logical volume 150 that may be distributed by a volume server 110 to one or more virtualization participants, according to one embodiment. In the depicted embodiment, configuration information 600 may include virtual-to-physical address map 610, virtualization participant information 615, and a generation identifier 605. The virtual-to-physical address map 610 may allow a back-end virtualization participant such as a storage server 130 to translate a target virtual address 500 included within an internal storage request to a physical block address at which a physical I/O may be needed. The virtualization participant information 615 may include an identification of an I/O coordinator or an identification of the set of back-end virtualization participants associated with the logical volume 150.

The generation identifier 605 may be used by the volume server 110 to identify different versions of configuration information 600. For example, when logical volume 150 is created, volume server 110 may associate an initial generation identifier 605 with the associated configuration information 600. If the configuration of volume 150 is later changed (e.g., due to the addition of new physical storage devices 140 to accommodate growing data, due to a reconfiguration after a failure, or due to a revocation of access rights from one or more volume clients 120, etc.), volume server 110 may be configured to send a modified version of configuration information 600 to the appropriate virtualization participants, including a modified generation identifier 605. Each virtualization participant may be configured to include the latest generation identifier 605 known to it (i.e., known to the virtualization participant) in internal storage requests directed at other virtualization participants. Whenever a target virtualization participant such as a storage server 130 receives an internal storage request for a volume 150, the generation identifier 605 contained within the internal storage request may be matched against the latest locally-known generation identifier for volume 150 (i.e., the latest generation identifier previously received from the volume server 110 at the target virtualization participant). If the two generation identifiers match, a desired I/O operation may be performed; otherwise, an error message may be generated. A use of generation identifiers 605 in this manner may help decrease the likelihood of accidental data corruption, or the likelihood of a provision of data to an untrusted entity such as a volume client 120 from whom access rights to a logical volume 150 have been revoked.

In some embodiments, not all devices or protocols providing access to the physical storage underlying a given logical volume 150 may support the use of generation identifiers 605 for data protection as described above. For example, in one embodiment, some storage servers 130 may support generation identifiers 605, while other devices (e.g., simple disk arrays or disks) that also map to the same logical volume 150 may use I/O fencing (e.g., using SCSI-3 group reservations) to provide data protection, or may not provide such data protection at all. Thus, in such embodiments, different portions of a single logical volume 150 may employ different data protection mechanisms (or no data protection mechanism), as desired.

Figure 7:
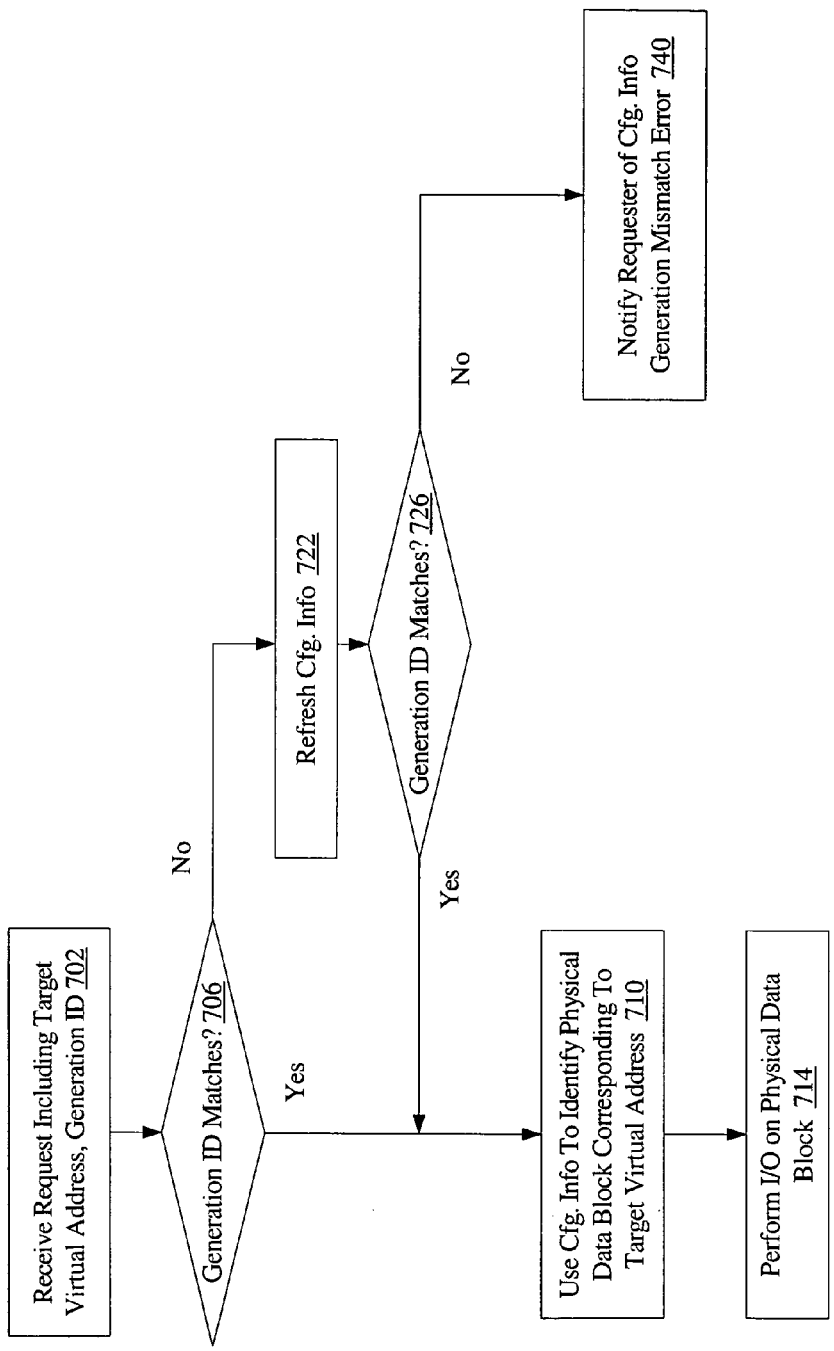
FIG. 7 is a flow diagram illustrating aspects of the operation of a target back-end virtualization participant, according to one embodiment where logical volume configuration information includes a generation identifier.

FIG. 7 is a flow diagram illustrating aspects of the operation of a target back-end virtualization participant, according to one embodiment where logical volume configuration information 600 includes a generation identifier 605. The target back-end virtualization participant may be configured to receive an internal storage request (e.g., from a front-end virtualization participant or from another back-end virtualization participant such as an I/O coordinator) including a generation identifier 605 for configuration information on logical volume 150, as well as a target virtual address of a target block of volume 150 (block 702 of FIG. 7). Prior to performing any physical I/O, the target back-end virtualization participant may attempt to match the generation identifier in the internal storage request with the latest generation identifier that had previously been received from volume server 110 at the target back-end virtualization participant for the volume 150 (block 706). If the match succeeds, i.e., if the two generation identifiers are identical, the target back-end virtualization participant may be configured to perform a virtual-to-physical address translation (block 710) to identify a physical data block corresponding to the virtual address, and to perform a desired physical I/O operation (block 714).

If the two generation identifiers do not match, in the depicted embodiment the target back-end virtualization participant may be configured to refresh its locally-maintained configuration information for volume 150 (block 722), e.g., by sending a request to obtain the latest configuration information to volume server 110. When the configuration information has been refreshed, the target back-end virtualization participant may be configured to attempt to match the generation identifier 605 in the refreshed configuration information with that in the internal storage request (block 726). If the match succeeds, the target back-end virtualization participant may be configured to continue with normal operation (i.e., to perform the operations of block 710 and 714). If the match fails even after the refresh of the configuration information, the target back-end virtualization participant may be configured to generate an error message, and to notify the requesting virtualization participant (i.e., the virtualization participant from which the internal storage request was received in an operation corresponding to block 702) of the generation identifier mismatch. The requesting virtualization participant may then attempt to update its own configuration information on volume 150, and may in some embodiments resend the storage request with an updated generation identifier 605.

It is noted that the technique of validating configuration information identifiers prior to performing a requested task may be performed by any virtualization participant configured to receive internal storage requests, including front-end virtualization participants. In addition, in some embodiments, the operations corresponding to blocks 722 and 726 may be omitted; that is, no attempt to refresh a local version of logical volume configuration information 600 may be made prior to notifying a requester that a generation identifier mismatch has occurred. In one embodiment, volume configuration information 600 may not include generation identifier 605, i.e., virtualization participants may not perform generation identifier matches as described above.

In some embodiments, volume server 110 may not be configured to distribute all the contents of volume configuration information 600 for a given volume 150 to each virtualization participant configured to cooperate to provide storage functions on volume 150. For example, in one embodiment, front-end virtualization participants may be provided only generation identifiers 605 and virtualization participant information 615, while back-end virtualization participants may be provided generation identifiers 605 and virtual-to-physical address maps 610. In other embodiments, for simplicity, volume server 110 may provide full configuration information 600 to each appropriate virtualization participant. In some embodiments, a volume server 110 may be configured to send volume configuration information 600 to virtualization participants on its own, i.e., without requiring a request for the configuration information. In contrast, in other embodiments, each virtualization participant may be configured to explicitly request desired volume configuration information 600 from the volume server 110, and the volume server 110 may be configured to distribute volume configuration information 600 only in response to such explicit requests.

Figure 8:
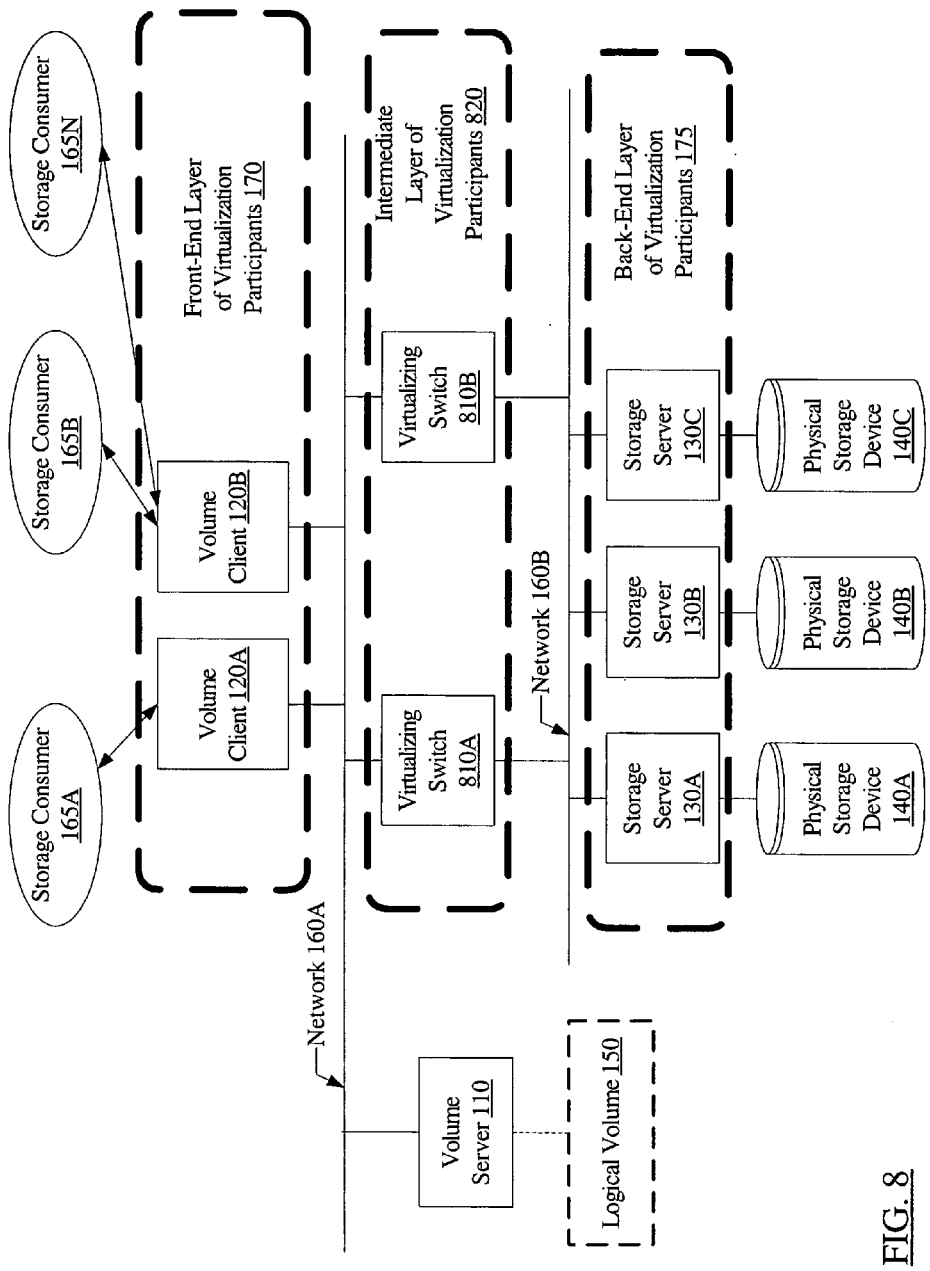
FIG. 8 is a block diagram illustrating an embodiment where an intermediate layer of virtualization participants is implemented between a front-end layer and a back-end layer.

While the embodiments described above have included two layers of virtualization participants, i.e., a front-end layer and a back-end layer, in some embodiments more than two layers of virtualization participants may be employed. FIG. 8 is a block diagram illustrating one embodiment where an intermediate layer of virtualization participants 820 is implemented between a front-end layer 170 and a back-end layer 175. In the illustrated embodiment, the intermediate layer 820 includes a first and virtualizing switch 810A and a second virtualizing switch 810B. A virtualizing switch may be any switch device, such as a fibre channel switch, that may be configured to provide certain storage virtualization functions in addition to providing storage connectivity. In some cases, an intermediate layer of virtualization participants may help provide desired flexibility and isolation between front-end and back-end layers—e.g., a first storage network 160A or fiber channel fabric may be used between front-end layer and the intermediate layer, and a second, separately configurable storage network 160B may be used between the intermediate layer and the back-end layer.

The techniques of distributing volume configuration information 600, and of using consistent virtual addresses to refer to a given block of a logical volume 150, may also be utilized in embodiments employing one or more intermediate layers of virtualization participants. For example, in one embodiment, the configuration information 600 may be used by a front-end virtualization participant to identify an intermediate virtualization participant (i.e., a virtualization participant in an intermediate layer 820, such as virtualizing switch 810A) to which an internal storage request (including a target virtual address for a target block of volume 150) corresponding to a storage consumer request may be directed. The intermediate virtualization participant may in turn use volume configuration information 600 to identify one or more back-end virtualization participants at which physical I/O operations corresponding to the storage consumer's request may be needed, and send internal storage requests including the target virtual address to the identified back-end virtualization participants, where the physical I/Os may then be performed. The techniques including attempts to match generation identifiers, prior to performing a requested task, may also be employed at intermediate layers of virtualization participants. E.g., in one embodiment, a virtualizing switch 810 may be configured to return an error message to a volume client 120 if a generation identifier contained within an internal storage request sent by the volume client does not match the latest generation identifier for the corresponding volume 150 previously received by the virtualizing switch 810.

In some embodiments, some parts of a logical volume 150 may be accessible via an intermediate layer of virtualization participants, while other parts of the same logical volume may not. That is, in such embodiments, access to different data blocks of the same logical volume 150 may require different numbers of layers of virtualization participants. In addition, not all virtualization participants at all the layers may be configured for virtual-to-physical address translation in some embodiments. Uniform virtual addresses may be used by a subset of virtualization participants at any of the layers, as desired. Thus, in different embodiments, uniform virtual addresses may be used between some front-end virtualization participants and some back-end virtualization participants, or between some front-end virtualization participants and some intermediate virtualization participants, or between intermediate virtualization participants and back-end virtualization participants.

Figure 9:
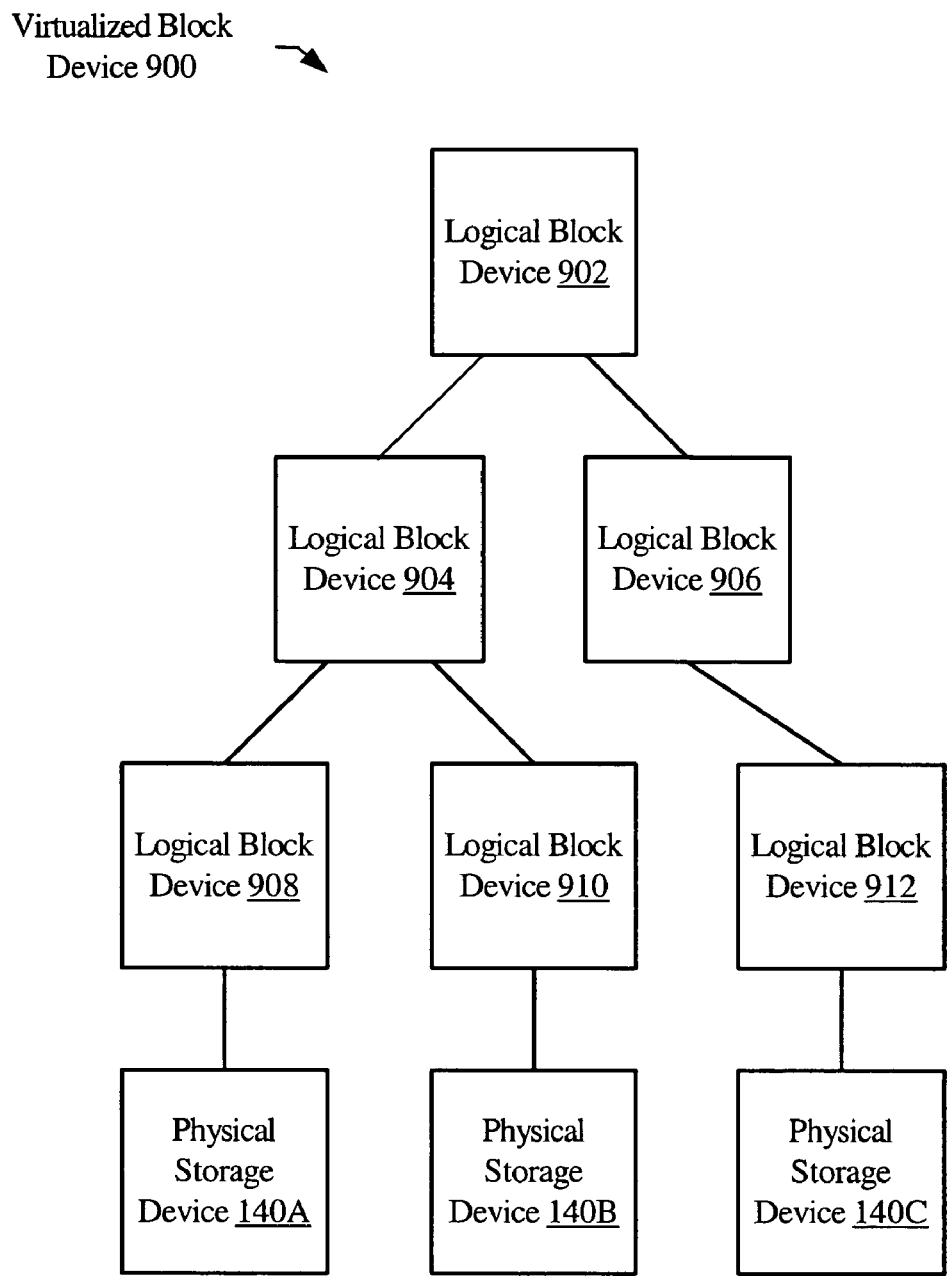
FIG. 9 is a block diagram illustrating one embodiment of a multi-layered virtualized block device that may be presented as a volume.

As noted above, in some embodiments, a given logical volume 150 may include multiple layers of virtualized devices. In some embodiments, different layers of such a multi-layer virtualized device may in turn be managed by, or accessible at, respective layers of virtualization participants. One embodiment of a multi-layered virtualized block device 900 that may be presented as a volume 150 is illustrated in FIG. 9. In the illustrated embodiment, virtualized block device 900 includes a volume block device 902 that includes logical block devices 904 and 906. Volume block devices 902, 904 and 906 may be managed at a first layer of virtualization participants, such as front-end layer 170; e.g., details of configuration of devices 902, 904 and 906 may be provided to the first layer by volume server 110. In turn, logical block device 904 includes logical block devices 908 and 910, while logical block device 906 includes logical block device 912. Logical block devices 908 and 910 map to physical block devices 140A-B of FIG. 2, respectively, while logical block device 912 maps to physical block device 140C. Configuration details of devices 908, 910, and 912 may be provided by a volume server 110 to a second layer of virtualization participants, such as back-end layer 175. Certain components of volume configuration information, such as generation identifiers, may be provided to both the first and second layer of virtualization participants.

Virtualized block device 900 may in its entirety represent the structure of the data comprising volume 150, which data may be physically stored in physical block devices 140A-C. Volume block device 902 may be configured to be mounted within a file system or presented to an application (i.e., a storage consumer 165) as the interface through which the storage consumer 165 may interact with given volume 150. Each block device that maps to or includes another block device may include an interface whereby the mapping or including block device may interact with the mapped or included device. For example, this interface may be a software interface whereby data and commands for block read and write operations is propagated from lower levels of the virtualization hierarchy to higher levels and vice versa.

Additionally, a given block device may be configured to map the logical block spaces of subordinate block devices into its logical block space in various ways in order to realize a particular virtualization function. For example, in one embodiment, virtualized block device 900 may be configured as a mirrored volume, in which a given data block written to virtualized storage device 900 is duplicated, and each of the multiple copies of the duplicated given data block are stored in respective block devices. In one such embodiment, a first virtualization participant managing volume block device 902 may be configured to receive an operation to write a data block from a storage consumer 165. The virtualization participant may duplicate the write operation and issue the write operation to both logical block devices 904 and 906 (using a consistent virtual address as described above for the data block in each write operation request), such that the block is written to both devices. In this context, logical block devices 904 and 906 may be referred to as mirrored plexes, mirror devices, or simply mirrors. In various embodiments, the first virtualization participant may read a given data block stored in duplicate in logical block devices 904 and 906 by issuing a read operation to one mirror device or the other, for example by alternating devices or defaulting to a particular device. Alternatively, the first virtualization participant may issue a read operation to multiple mirror devices and accept results from the fastest responder.

In one specific embodiment, it may be the case that underlying physical block devices 140A-C have dissimilar performance characteristics; specifically, devices 140A-B may be slower than device 140C. In order to balance the performance of the mirror devices, in one embodiment, logical block device 904 may be implemented as a striped device in which data is distributed between logical block devices 908 and 910. For example, even- and odd-numbered blocks of logical block device 904 may be mapped to logical block devices 908 and 910 respectively, each of which may be configured to map in turn to all or some portion of physical block devices 140A-B respectively. In such an embodiment, block read/write throughput may be increased over a non-striped configuration, as it may be possible to read or write two blocks logical block device 904 concurrently instead of one. Numerous striping arrangements involving various distributions of blocks to logical block devices are possible and contemplated; such arrangements may be chosen to optimize for various data usage patterns such as predominantly sequential or random usage patterns.

Numerous other possible configurations of block devices are contemplated that may incorporate more or fewer layers of virtualization to realize within a given instance of virtualized block device 900 virtualization functions similar to or different from those described above. For example, volume block device 902 may employ a greater number of mirror devices, striping may occur higher in the hierarchy than mirroring, certain logical block devices may be configured to perform snapshots of other devices, certain logical block devices may span multiple physical block devices, etc. The techniques of distributing logical volume configuration 600 to the various layers of virtualization participants, and of using virtual addresses for a given block of a logical volume, described above, may be used in a configuration employing arbitrarily complex multi-layer volumes.

A volume server 110 may be any type of device, computer host or software module, that is capable of providing the virtualization functionality described above. For example, in one embodiment, a volume server may be a computer system including one or more processors and one or more memories. A virtualization participant, such as a volume client 120 or a storage server 130 may be any type of device, host or module capable of receiving volume configuration information from a volume server 110, and cooperating with other virtualization participants for data storage and retrieval on a logical volume. Like a volume server, a virtualization participant may also be a computer system including one or more processors, one or more memories. In some embodiments, a virtualization participant may be a virtualization switch 810, or an embedded system configured to use application specific integrated circuit (ASIC) or field-programmable gate array (FPGA) technology to execute the virtualization-related operations described above. In some embodiments, part or all of the functions provided by a volume server 110 and one or more virtualization participants may be incorporated at a single computer host. In one embodiment, a volume server 110 or a virtualization participant may be implemented as a cluster of nodes configured for high availability, e.g., in the event of a failure at a particular cluster node, the volume server and/or virtualization participant functions initially supported by the failed node may be taken over by another node. Network 160 may be implemented using any desired networking technology or protocol, such as IP over Ethernet, fibre channel, etc., and may include one or more independently configurable storage networks in some embodiments. Numerous other configurations of volume servers 110, virtualization participants such as volume clients 120 and storage servers 130, and network 160 are possible and contemplated.

Figure 10:
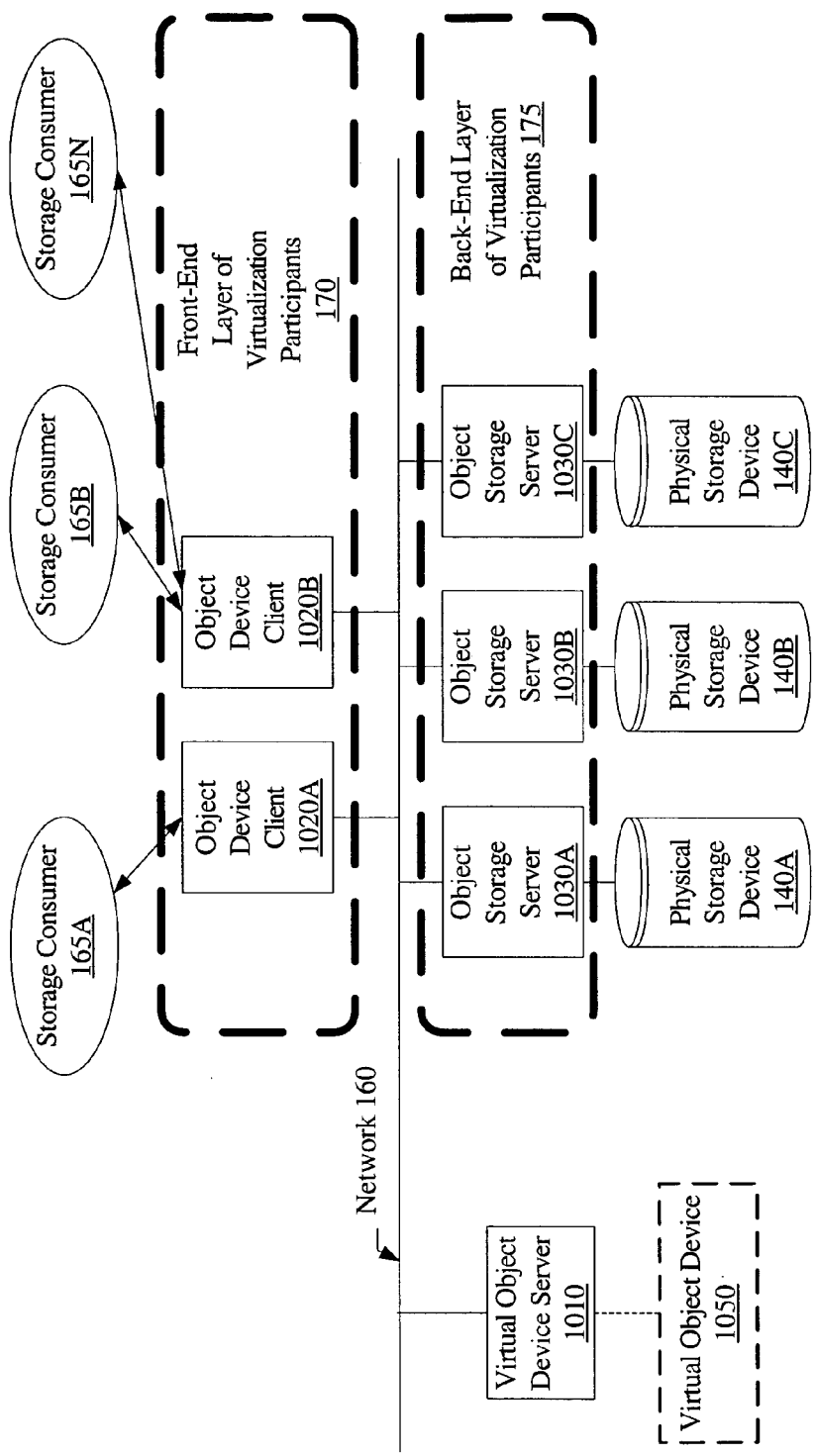
FIG. 10 is a block diagram illustrating an embodiment where object-based virtualization is employed.

While block-based storage virtualization has been employed in the embodiments described above, the general technique of utilizing consistent virtual addresses in communications between virtualization participants in a multi-layered virtualization environment may also be used in embodiments employing other types of virtualization. For example, in some embodiments, object-based virtualization may be employed: that is, a virtual object device server may be configured to organize storage within storage devices 140 as higher-level logical objects (such as files) instead of using the block-based interface described above. In such an object virtualization environment, virtual storage may be named, managed, and made accessible using any desired base object as implemented by the virtual object device server, such as a file object or a database table object. FIG. 10 is a block diagram illustrating an embodiment where object-based virtualization is employed. In such an embodiment, the front-end layer of virtualization participants 170 may include object device clients 1020A and 1020B, and the back-end layer of virtualization participants 175 may include object storage servers 1030A-1030C (which may also be referred to as object storage devices). Virtual object storage device server 1010 may provide configuration information on a virtual object device 1050 to front-end virtualization participants 1020 as well as to back-end virtualization participants 1030. The virtual object device 1050 may be presented, for example, as a collection of named files. Virtualization participants may be configured to refer to targeted blocks of virtual object device 1050 using consistent object virtual addresses (e.g., a file identifier and an offset within a file) in communicating with each other to perform desired storage operations.

Figure 11:
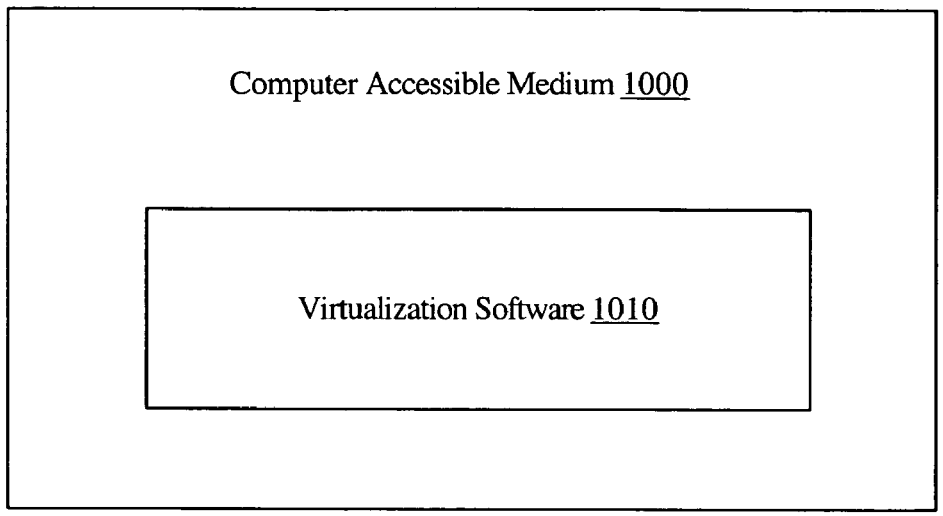
FIG. 11 is a block diagram illustrating one embodiment of a computer accessible medium.

FIG. 11 is a block diagram illustrating one embodiment of a computer accessible medium 1100 including virtualization software 1110 executable to provide the functionality of volume servers 110 and virtualization participants described above. In different embodiments, virtualization software 1110 may be provided to a computer system using a variety of computer-accessible media including electronic media (e.g., flash memory), magnetic media such as RAM (e.g., SDRAM, RDRAM, SRAM, etc.), optical storage media such as CD-ROM, etc., as well as transmission media or signals such as electrical, electromagnetic or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a volume server;
one or more physical storage devices including a first physical storage device;
a front-end layer of virtualization participants, including a front-end virtualization participant; and
a back-end layer of virtualization participants, including a first back-end virtualization participant;
wherein each of said front-end layer of virtualization participants is configured to interact with one or more storage consumers to receive external storage requests from said one or more storage consumers, wherein said one or more storage consumers are external to said front-end layer and said back-end layer of virtualization participants;
wherein each of said back-end layer of virtualization participants is configured to provide said volume server and other ones of said front-end and said back-end layers of virtualization participants with access to one or more of said physical storage devices, but is not directly accessible by said one or more storage consumers;
wherein the volume server is configured to:
aggregate storage in the one or more physical storage devices into a logical volume; and
provide configuration information for the logical volume to the front-end virtualization participant and the first back-end virtualization participant, wherein the configuration information includes a generation identifier indicative of a version of the configuration information;
wherein the front-end virtualization participant is configured to:
send a first internal storage request including a target virtual address identifying a target block of the logical volume to the first back-end virtualization participant, wherein the first internal storage request includes a front-end generation identifier corresponding to a latest version of the configuration information available at the front-end virtualization participant;
wherein the first back-end virtualization participant is configured to:
use the configuration information to translate the target virtual address to a corresponding physical block address of the first physical storage device; and
perform a first physical I/O operation on a first physical data block stored at the physical block address corresponding to the target virtual address.

2. The system as recited in claim 1, wherein the one or more physical storage devices includes a second physical storage device, wherein the first back-end virtualization participant is configured to provide access to the first physical storage device, wherein the back-end layer includes a second back-end virtualization participant configured to provide access to the second physical storage device, and wherein the volume server is further configured to provide the configuration information to the second back-end virtualization participant.

3. The system as recited in claim 2, wherein the first internal storage request is generated at the front-end virtualization participant in response to an external request from one of said one or more storage consumers, wherein the second back-end virtualization participant is configured to:
receive a second internal storage request corresponding to the external request including the target virtual address;
use the configuration information to identify a second physical data block at the second physical storage device corresponding to the target virtual address; and
perform a second physical I/O operation on the second physical data block.

4. The system as recited in claim 3, wherein the second internal storage request is sent to the second back-end virtualization participant by the first back-end virtualization participant.

5. The system as recited in claim 3, wherein the second internal storage request is sent to the second storage server by the front-end virtualization participant.

6. The system as recited in claim 1, wherein the target virtual address includes a logical volume identifier and an offset within the logical volume.

7. The system as recited in claim 1, wherein the first back-end virtualization participant is further configured to:
verify that the front-end generation identifier in the first internal storage request matches a local generation identifier corresponding to a latest local version of the configuration information available at the first back-end virtualization participant prior to performing the first physical I/O operation.

8. A method comprising:
aggregating storage in one or more physical storage devices, including a first physical storage device, into a logical volume;
providing configuration information for the logical volume to a front-end virtualization participant at a front-end layer of virtualization participants and to a first back-end virtualization participant at a back-end layer of virtualization participants, wherein the configuration information includes a generation identifier indicative of a version of the configuration information;
each of said front-end layer of virtualization participants interacting directly with one or more storage consumers to receive external storage requests from said one or more storage consumers, wherein said one or more storage consumers are external to said front-end layer and said back-end layer of virtualization participants;
each of said back-end layer of virtualization participants providing said volume server and other ones of said front-end and said back-end layers of virtualization participants with access to one or more of said physical storage devices without being directly accessible by said one or more storage consumers;
sending a first internal storage request including a target virtual address identifying a target block of the logical volume from the front-end virtualization participant to the first back-end virtualization participant wherein the first internal storage request includes a front-end generation identifier corresponding to a latest version of the configuration information available at the front-end virtualization participant;
using the configuration information at the first back-end virtualization participant to translate the target virtual address to a corresponding physical block address of the first physical storage device; and
performing a first physical I/O operation on a first physical data block stored at the physical block address corresponding to the target virtual address.

9. The method as recited in claim 8, wherein the one or more physical storage devices includes a second physical storage device, further comprising:
providing access to the first physical storage device from the first back-end virtualization participant;
providing access to the second physical storage device from a second back-end virtualization participant at the back-end layer; and
providing the configuration information to the second back-end virtualization participant.

10. The method as recited in claim 9, further comprising:
generating the first internal storage request at the front-end virtualization participant in response to an external request from one of said one or more storage consumers;
receiving a second internal storage request corresponding to the external request, including the target virtual address, at the second back-end virtualization participant;
using the configuration information at the second back-end virtualization participant to identify a second physical data block at the second physical storage device corresponding to the target virtual address; and
performing a second physical I/O operation on the second physical data block.

11. The method as recited in claim 10, wherein the second internal storage request is sent to the second back-end virtualization participant by the first back-end virtualization participant.

12. The method as recited in claim 10, wherein the second internal storage request is sent to the second back-end virtualization participant by the front-end virtualization participant.

13. The method as recited in claim 8, wherein the target virtual address includes a logical volume identifier and an offset within the logical volume.

14. The method as recited in claim 8, further comprising:
verifying that the front-end generation identifier in the first internal storage request matches a local generation identifier corresponding to a latest local version of the configuration information available at the first back-end virtualization participant prior to performing the first physical I/O operation.

15. A computer accessible storage medium comprising program instructions, wherein the instructions are computer-executable to:
aggregate storage in one or more physical storage devices, including a first physical storage device, into a logical volume;
provide configuration information for the logical volume to a front-end virtualization participant at a front-end layer of virtualization participants and to a first back-end virtualization participant at a back-end layer of virtualization participants, wherein the configuration information includes a generation identifier indicative of a version of the configuration information;
implement each of said front-end layer of virtualization participants interacting directly with one or more storage consumers to receive external storage requests from said one or more storage consumers, wherein said one or more storage consumers are external to said front-end layer and said back-end layer of virtualization participants;
implement each of said back-end layer of virtualization participants providing said volume server and other ones of said front-end and said back-end layers of virtualization participants with access to one or more of said physical storage devices without being directly accessible by said one or more storage consumers;
send a first internal storage request including a target virtual address identifying a target block of the logical volume from the front-end virtualization participant to the first back-end virtualization participant, wherein the first internal storage request includes a front-end generation identifier corresponding to a latest version of the configuration information available at the front-end virtualization participant;
use the configuration information at the first back-end virtualization participant to translate the target virtual address to a corresponding physical block address of the first physical storage device; and
perform a first physical I/O operation on a first physical data block stored at the physical block address corresponding to the target virtual address.

16. The computer accessible storage medium as recited in claim 15, wherein the one or more physical storage devices includes a second physical storage device, wherein the instructions are further computer-executable to:
provide access to the first physical storage device from the first back-end virtualization participant;
provide access to the second physical storage device from a second back-end virtualization participant at the back-end layer; and
provide the configuration information to the second back-end virtualization participant.

17. The computer accessible storage medium as recited in claim 16, wherein the instructions are further computer-executable to:

generate the first internal storage request at the front-end virtualization participant in response to an external request from one of said one or more storage consumers;

receive a second internal storage request corresponding to the external request, including the target virtual address, at the second back-end virtualization participant;

use the configuration information at the second back-end virtualization participant to identify a second physical data block at the second physical storage device corresponding to the target virtual address; and perform a second physical I/O operation on the second physical data block.

18. The computer accessible storage medium as recited in claim 17, wherein the second internal storage request is sent to the second back-end virtualization participant by the first back-end virtualization participant.

19. The computer accessible storage medium as recited in claim 17, wherein the second internal storage request is sent to the second back-end virtualization participant by the front-end virtualization participant.

20. The computer accessible storage medium as recited in claim 15, wherein the target virtual address includes a logical volume identifier and an offset within the logical volume.

21. The computer accessible storage medium as recited in claim 15, wherein the instructions are further computer-executable to:

verify that the front-end generation identifier in the first internal storage request matches a local generation identifier corresponding to a latest local version of the configuration information available at the first back-end virtualization participant prior to performing the first physical I/O operation.

* * * * *